US009396239B2

(12) United States Patent
Yubamoto et al.

(10) Patent No.: US 9,396,239 B2
(45) Date of Patent: Jul. 19, 2016

(54) COMPILING METHOD, STORAGE MEDIUM AND COMPILING APPARATUS

(71) Applicant: Hitachi, Ltd., Tokyo (JP)

(72) Inventors: Jun Yubamoto, Tokyo (JP); Tetsuro Abe, Tokyo (JP); Hiroshi Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/323,288

(22) Filed: Jul. 3, 2014

(65) Prior Publication Data

US 2015/0033213 A1      Jan. 29, 2015

(30) Foreign Application Priority Data

Jul. 26, 2013 (JP) ................. 2013-155531

(51) Int. Cl.
*G06F 9/45* (2006.01)
*G06F 17/30* (2006.01)

(52) U.S. Cl.
CPC .............. *G06F 17/3056* (2013.01); *G06F 8/41* (2013.01); *G06F 8/43* (2013.01)

(58) Field of Classification Search
CPC ......... G06F 11/3624; G06F 8/30; G06F 8/60; G06F 8/75; G06F 17/3056
See application file for complete search history.

(56) References Cited

U.S. PATENT DOCUMENTS

| | | | | |
|---|---|---|---|---|
| 2006/0143597 | A1* | 6/2006 | Alaluf et al. ................. | 717/136 |
| 2008/0127070 | A1* | 5/2008 | Barcia et al. ................. | 717/116 |
| 2009/0276754 | A1* | 11/2009 | Lind et al. .................... | 717/106 |
| 2009/0282401 | A1* | 11/2009 | Todorova ..................... | 717/175 |
| 2012/0324432 | A1* | 12/2012 | Mizrachi et al. ............. | 717/162 |
| 2013/0145348 | A1* | 6/2013 | Agovic ............... G06F 17/3056 717/120 |

FOREIGN PATENT DOCUMENTS

JP      2012-014506 A      1/2012

OTHER PUBLICATIONS

Konstantin K., "Java Annotations and Reflection: Powerful Building Blocks for a DBMS interface", Sep. 16, 2010, pp. 1-8 <Konstantin_2010.pdf>.*
"Annotation Processing Tool (apt)", Oracle [online], retrieved on Mar. 15, 2013, <URL: http://docs.oracle.com/javase/6/docs/technotes/guides/apt/index.html>.

* cited by examiner

*Primary Examiner* — Tuan Vu
(74) *Attorney, Agent, or Firm* — Volpe and Koenig, P.C.

(57) ABSTRACT

A compiling method for reading, by a computer comprising a processor and a memory, a source file therein and outputting an executable binary file, the compiling method including: a first step of receiving, by the computer, an interface file including a process and a module constructing a business process, input/output information of data of the business process being defined in the interface file, operation information for data set to be used in the business process being defined in the interface file; a second step of validating, by the computer, the operation information for the data set defined in the interface file; a third step of inhibiting, by the computer, generation of the executable binary file when a validation result is invalid; and a fourth step of generating, by the computer, the executable binary file from a source file containing the interface file when the validation result is valid.

15 Claims, 17 Drawing Sheets

```
@BusinessProcess
  (executedBusinessProcess="BusinessProcess202")          /301
public interface BusinessProcess201{

@MessageDef
  public class Message {

@In                                              /203
    public DataA dataA;

@Out                                             /204
    public DataD dataD;
  }

@ProcessDef(execSeqNo=1)
  Class<Process211> Process211 = Process211.class;

@ProcessDef(execSeqNo=2)                           /302
  Class<Process217> Process217 = Process217.class;

@ProcessDef(execSeqNo=3)
  Class<Process218> Process218 = Process218.class;
}
```

FIG. 4A

```
@Process
public interface Process211 {

@MessageDef
  public class Message {

@In                                              /212
    public DataA dataA;

@Out                                             /213
    public DataC dataC;
  }
                                                     /321
  @Initial
  @ModuleDef(edge={"pass->Module225"})               /322
  Class<Module221> Module221 = Module221.class;

@ModuleDef(edge={"pass-> end "})                   /323
  Class<Module225> Module225 = Module225.class;
}
```

FIG. 4B

```
@Module(crud={""})
public interface Module221 {

@MessageDef
    public class Message {

@In
      public DataA  dataA;         ~222

@Out
      public DataB  dataB;         ~223
    }

@PortDef
    public enum Port {             ~224
       pass
    }
}
```

FIG. 4C

```
                               226
@Module(crud={"TableA.C"})       ~
public interface Module225 {

@MessageDef
    public class Message {

@In
      public DataB  dataB;         ~227

@Out
      public DataC dataC;          ~228
    }

@PortDef
    public enum Port {             ~229
       pass
    }
}
```

FIG. 4D

| ITEM NO. | FIRST | SECOND | THIRD | COLLECTION RESULT |
|---|---|---|---|---|
| 1 | C (CREATE) | - | - | C (CREATE) |
| 2 | D (DELETE) | - | - | -(NULL) |
| 3 | D (DELETE) | C (CREATE) | - | C (CREATE) |
| 4 | D (DELETE) | D (DELETE) | C (CREATE) | C (CREATE) |
| 5 | C (CREATE) | D (DELETE) | - | -(NULL) |
| 6 | C (CREATE) | C (CREATE) | D (DELETE) | C (CREATE) |
| 7 | C (CREATE) | D (DELETE) | C (CREATE) | C (CREATE) |

*FIG. 11*

| ITEM NO. | COLLECTION RESULT IN FIG. 11 | CRUD COLLECTION FOR EACH PROCESS OF TARGET BUSINESS PROCESS | | REPORT INFORMATION |
| | | FIRST | SECOND | |
|---|---|---|---|---|
| 1 | -(NULL) | C (CREATE) | - | -(NULL) |
| 2 | C (CREATE) | C (CREATE) | - | -(NULL) |
| 3 | C (CREATE) | D (DELETE) | - | -(NULL) |
| 4 | C (CREATE) | D (DELETE) | C (CREATE) | -(NULL) |
| 5 | C (CREATE) | D (DELETE) | R (READ) OR U (UPDATE) OR D (DELETE) | WARNING |
| 6 | -(NULL) | C (CREATE) | D (DELETE) | ERROR |
| 7 | C (CREATE) | C (CREATE) | D (DELETE) | ERROR |

*FIG. 12*

COMPILING METHOD, STORAGE MEDIUM AND COMPILING APPARATUS

CLAIM OF PRIORITY

The present application claims priority from Japanese patent application JP 2013-155531 filed on Jul. 26, 2013, the content of which is hereby incorporated by reference into this application.

BACKGROUND

This invention relates to efficient development of an application on an event control infrastructure.

A basic information system includes an Operations Support System/Business Support System (OSS/BSS) infrastructure (hereinafter referred to as "event control infrastructure") for client management and billing, physical distribution, agents, and so forth to enable a telecommunications carrier to provide services.

With regard to the basic information system, JP 2012-14506 A, for example, describes that an order of executing a plurality of transactions is defined in a business process, and conditions for activating expansion functions for the plurality of transactions are managed by different definitions, to thereby detect a timing at which a specific transaction is executed, and perform the processing of the associated expansion function.

A current Annotation Processing Tool (apt) is described below as the related art of the technical field of this invention.

The apt is accessed by an option of a javac command (command to activate a Java compiler), and executes an annotation processor for creating new source codes and another file to compile the source file and the created file (see, for example, apt (Annotation Processing Tool), "annotation processing tool".

In general, an annotation processor that is executed by the apt processes Java source codes and annotation, and is used to implement checking and creation of files, and assist development of an application.

SUMMARY

The event control infrastructure divides a business process into completely independent process units called "processes" to enable loosely-coupled development, thereby improving the development efficiency. Further, a common process is extracted to be used in a plurality of business processes, making it possible to reduce the number of development procedures.

In this case, however, the process is performed using the result of a process which has been executed before this process, and hence activation of the process inevitably needs a prerequisite such as "there should be data A" and "the table should contain a target record".

Accordingly, when a partial change in a business process changes the prerequisite of a common process, a developer registers all the business processes that use the common process, and checks the specification and source to specify the change before correcting the common process. Overlooked corrections of the common process may be found in an integration test or a system test, which does not leave much time till the release of the business process, undesirably resulting in reworking.

Accordingly, this invention has been made in view of the above-mentioned problem, and it is an object of this invention to improve the efficiency of developing an application by detecting faults in a source file early.

A representative aspect of the present disclosure is as follows. A compiling method for reading, by a computer comprising a processor and a memory, a source file thereinto and outputting an executable binary file, the compiling method comprising: a first step of receiving, by the computer, an interface file including a process and a module constructing a business process, input/output information of data of the business process being defined in the interface file, operation information for data set to be used in the business process being defined in the interface file; a second step of validating, by the computer, the operation information for the data set defined in the interface file; a third step of inhibiting, by the computer, generation of the executable binary file when a validation result is invalid; and a fourth step of generating, by the computer, the executable binary file from a source file containing the interface file when the validation result is valid.

Therefore, according to one embodiment of this invention, the input/output information and the manipulation information are validated at the time of compiling the source file, and hence it is possible to detect overlooked corrections or differences in the source file early, to thereby improve the efficiency of developing an application.

BRIEF DESCRIPTION OF THE DRAWINGS

FIG. 4A illustrates an example of a java interface file indicating the business process illustrated in FIGS. 3A and 3C according to the embodiment of this invention.

FIG. 4B illustrates an example of a java interface file indicating the business process illustrated in FIGS. 3A and 3C according to the embodiment of this invention.

FIG. 4C illustrates an example of a java interface file indicating the module illustrated in FIGS. 3A and 3C according to the embodiment of this invention.

FIG. 4D illustrates an example of a java interface file indicating the module illustrated in FIGS. 3A and 3C according to the embodiment of this invention.

FIG. 11 shows a pattern of collection of CRUD information of a premise business process according to the embodiment of this invention.

FIG. 12 shows the relation between patterns of the collection result for a business process to be validated according to the embodiment of this invention.

DETAILED DESCRIPTION OF THE PREFERRED EMBODIMENT

The following describes an embodiment of this invention referring to the accompanying drawings.

Figure 1:
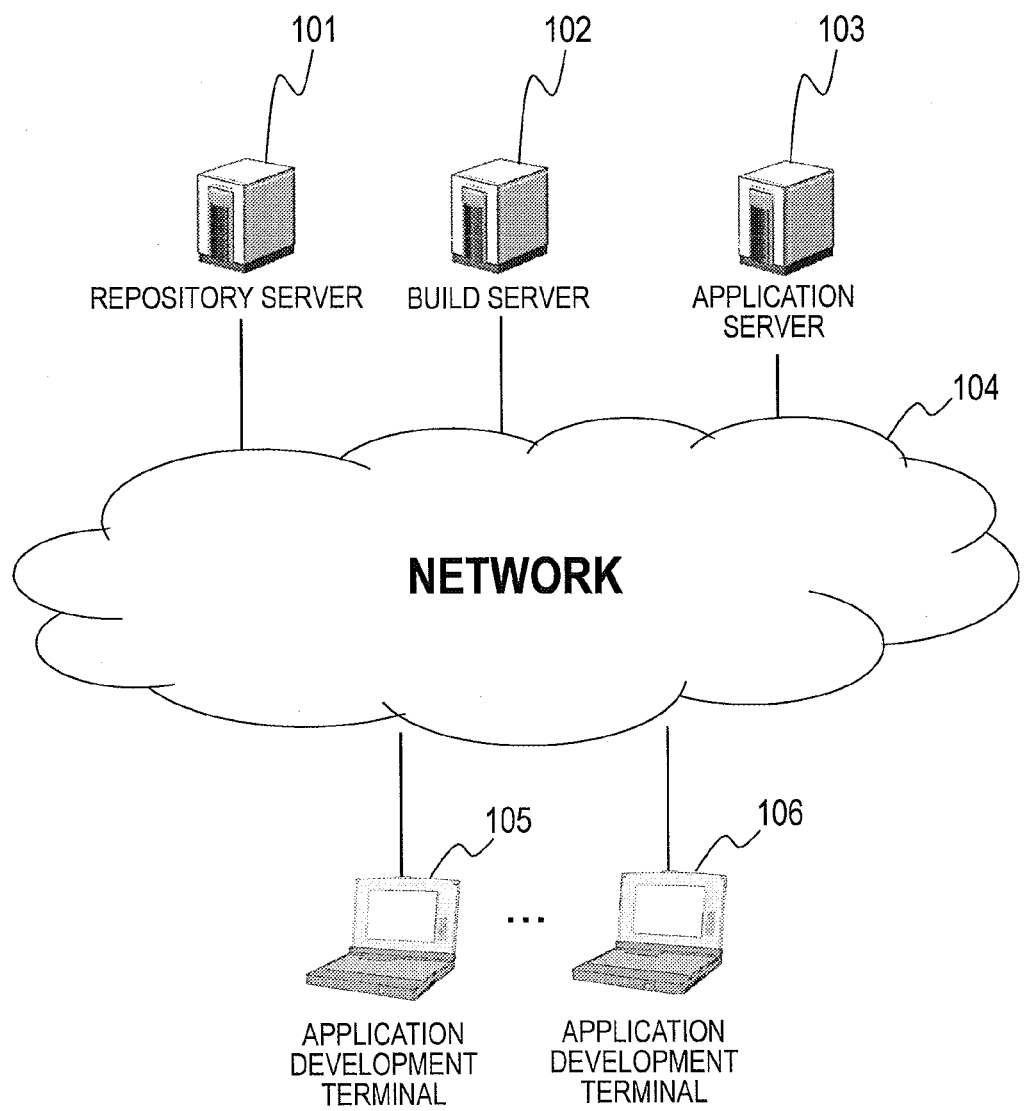
FIG. 1 is a block diagram illustrating an example of a computer system for developing applications according to the embodiment of this invention.

FIG. 1 is a block diagram illustrating an example of a computer system for developing applications according to the embodiment of this invention.

Referring to FIG. 1, a repository server 101, a build server 102, an application server 103, and application development terminals 105 and 106 are each coupled to a network 104 over which communications between their computers are carried out. It should be noted that the number of application development terminals 105 and 106 is not limited to two, but a desired number of application development terminals may be provided.

The repository server 101 stores data relating to development of an application. For example, the repository server 101 stores the specifications of an application, source codes thereof, executable binary files, and the like. Further, the repository server 101 can manage, for example, the version of an application.

The build server 102 compiles source codes to output an executable binary file (or an object code). The application development terminals 105 and 106 edit and compile the source codes. The application server 103 executes a developed application (executable binary file). In this embodiment, the build server 102 and the application development terminals 105 and 106 have the same configuration to be able to edit (code) and compile source codes.

Figure 2:
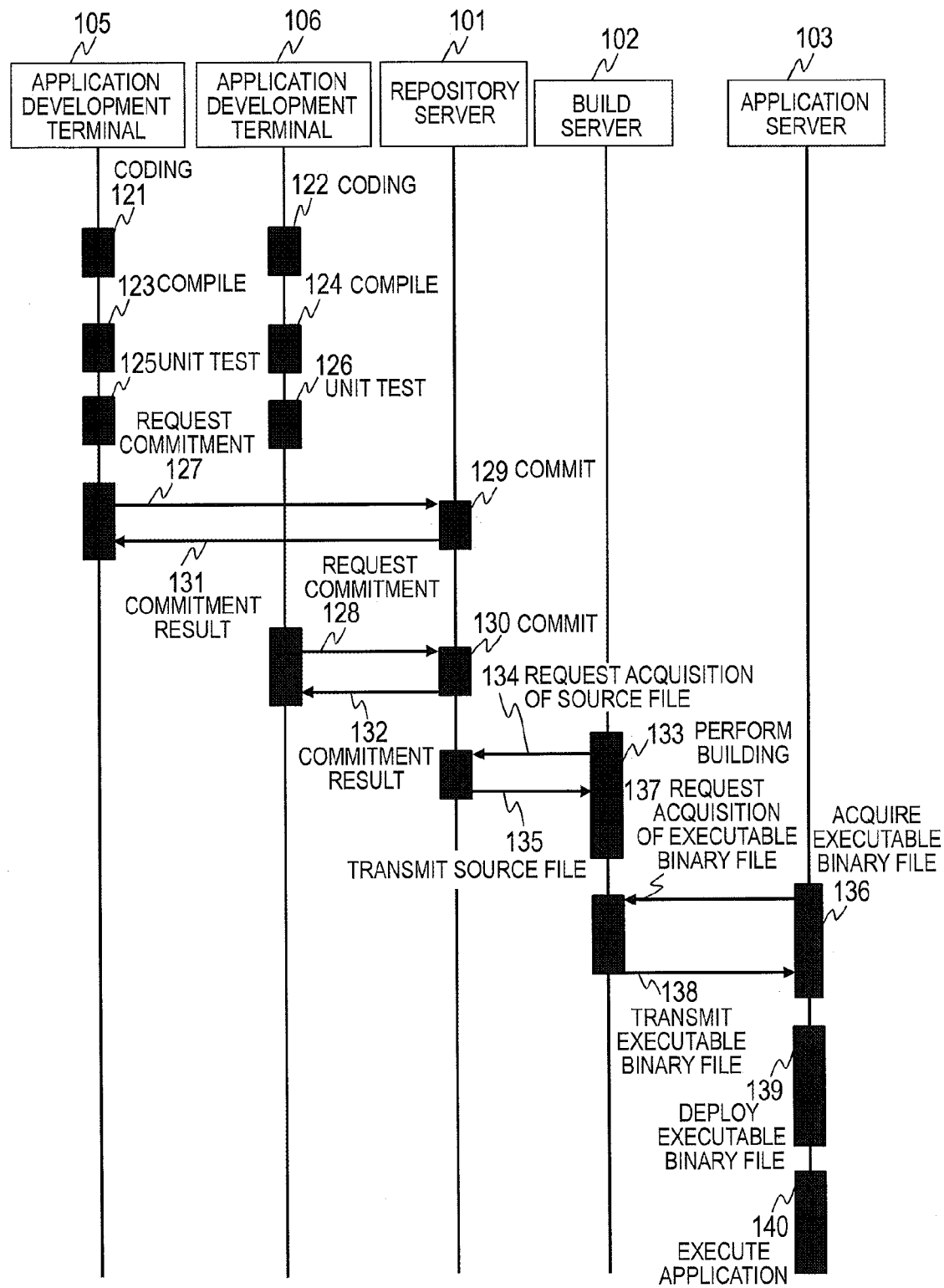
FIG. 2 is a sequence diagram illustrating an example of processing from development of an application according to the embodiment of this invention.

FIG. 2 is a sequence diagram illustrating an example of processing from development of an application at the application development terminal 105, the application development terminal 106, and the build server 102 till execution of the application at the application server 103.

First, in Steps 121 and 122, a developer uses the application development terminals 105 and 106 to perform editing (coding) of a source file including java interface files illustrated in FIGS. 4A to 4D.

Next, in Steps 123 and 124, the application development terminals 105 and 106 receive and compile the source file to generate an executable binary file. At this time, the application development terminals 105 and 106 each execute an annotation analysis part 407, an error reporting part 408, and an automatic generation part 409, which are unique parts of this invention and illustrated in FIG. 5.

The developer who uses the application development terminal 105 or 106 checks the compiling result, and performs coding in Steps 121 and 122 again when the compiling result is abnormal. When the compiling result is normal, on the other hand, unit tests are performed in Steps 125 and 126 to check whether the coded java interface file is correct.

Then, in Steps 127 and 128, a request for commitment (storage) of a source file including the coded java interface file is made to the repository server 101 from each of the application development terminals 105 and 106. The repository server 101 having received the commitment request executes commitment of a latest source file in Steps 129 and 130, and returns the commitment result to the requester in Steps 131 and 132. The developer checks whether the commitment result is normal at the application development terminals 105 and 106 that have received the commitment result.

Next, the build server 102 performs building in Step 133, and transmits a source file acquisition request to the repository server 101 in Step 134. Although the build server 102 performs building in a predetermined cycle in this embodiment, the build server 102 may perform building in response to an instruction from the repository server 101 or the application development terminal 105 or 106.

In Step 135, the repository server 101 having received the source file acquisition request transmits a source file to the build server 102. The build server 102 having received the source file resumes execution of building in Step 133, compiles the received source file, and causes each of the application development terminals 105 and 106 to execute the annotation analysis part 407, the error reporting part 408, and the automatic generation part 409, which are unique parts of this invention and illustrated in FIG. 5. Although not shown, the build server 102 can report the result of building to the application development terminal 105 or the like by using the error reporting part 408 or the like, or store the result of building in the repository server 101. The developer can check the compiling result at the application development terminal 105 or 106, and, when the compiling result is abnormal, can perform coding of the source file providing the abnormal result again in Steps 121 and 122. When the compiling result is normal, the build server 102 generates the executable binary file, which is the result of compiling the source file, and compresses the executable binary file.

Next, in Step 136, the application server 103 acquires the executable binary file generated by the build server 102, and transmits an executable binary file acquisition request to the build server 102 in Step 137.

In Step 138, the build server 102 having received the executable binary file acquisition request transmits an executable binary file to the application server 103. In Step 139, the application server 103 deploys the received compressed executable binary file in a memory (not shown) in executable binary file deployment. Then, in Step 140, the application server 103 executes the application developed at the application development terminal 105 and the application development terminal 106.

The acquisition processing for the executable binary file in Step 136 can be carried out by the application server 103 in a predetermined cycle. Alternatively, the application server 103 may perform the acquisition processing for the executable binary file in response to a request received from the application development terminal 105 or the like.

Figure 3A:
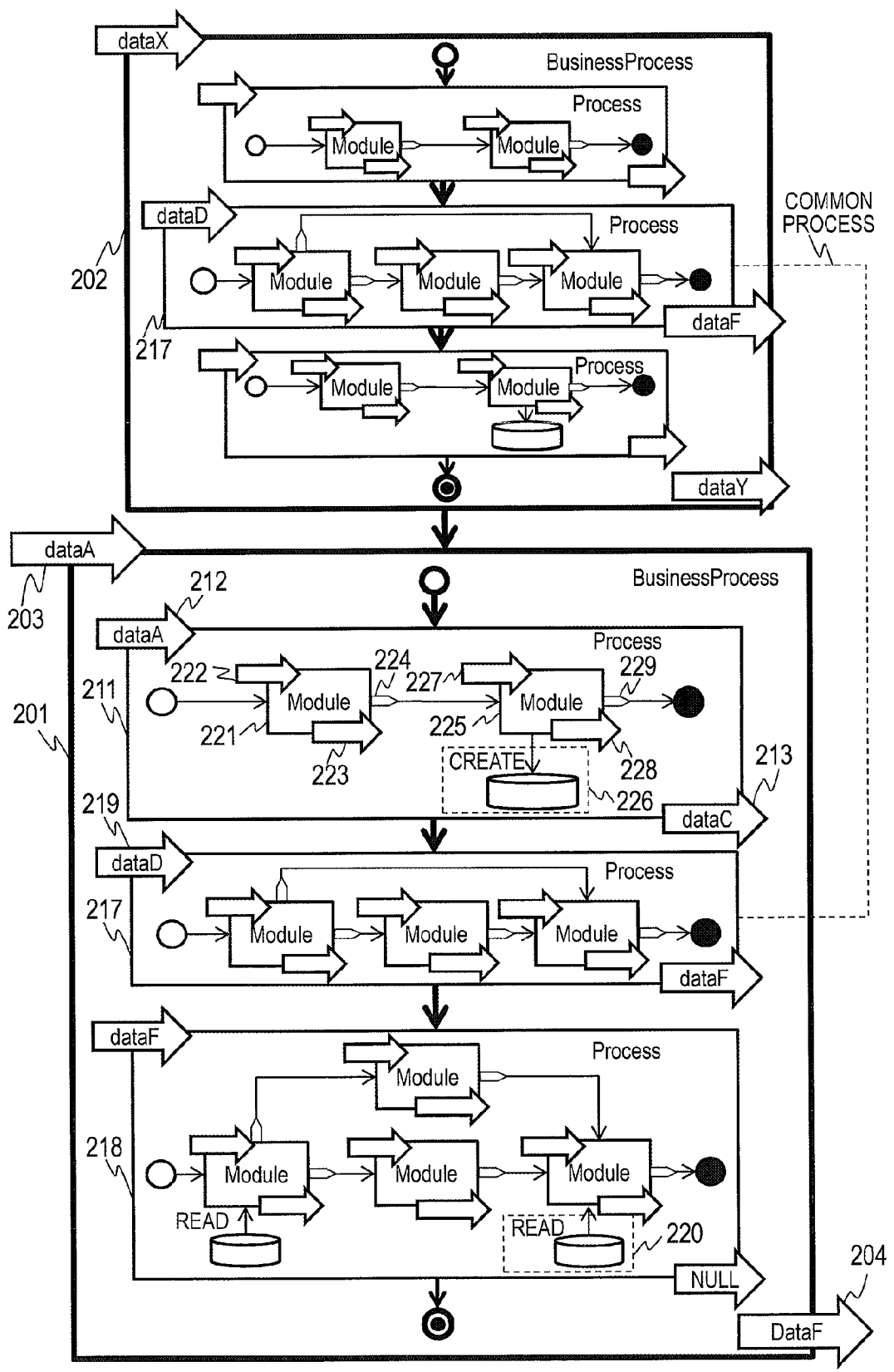
FIG. 3A is an exploded view illustrating an example of process units of the business processes according to the embodiment of this invention.
Figure 3B:
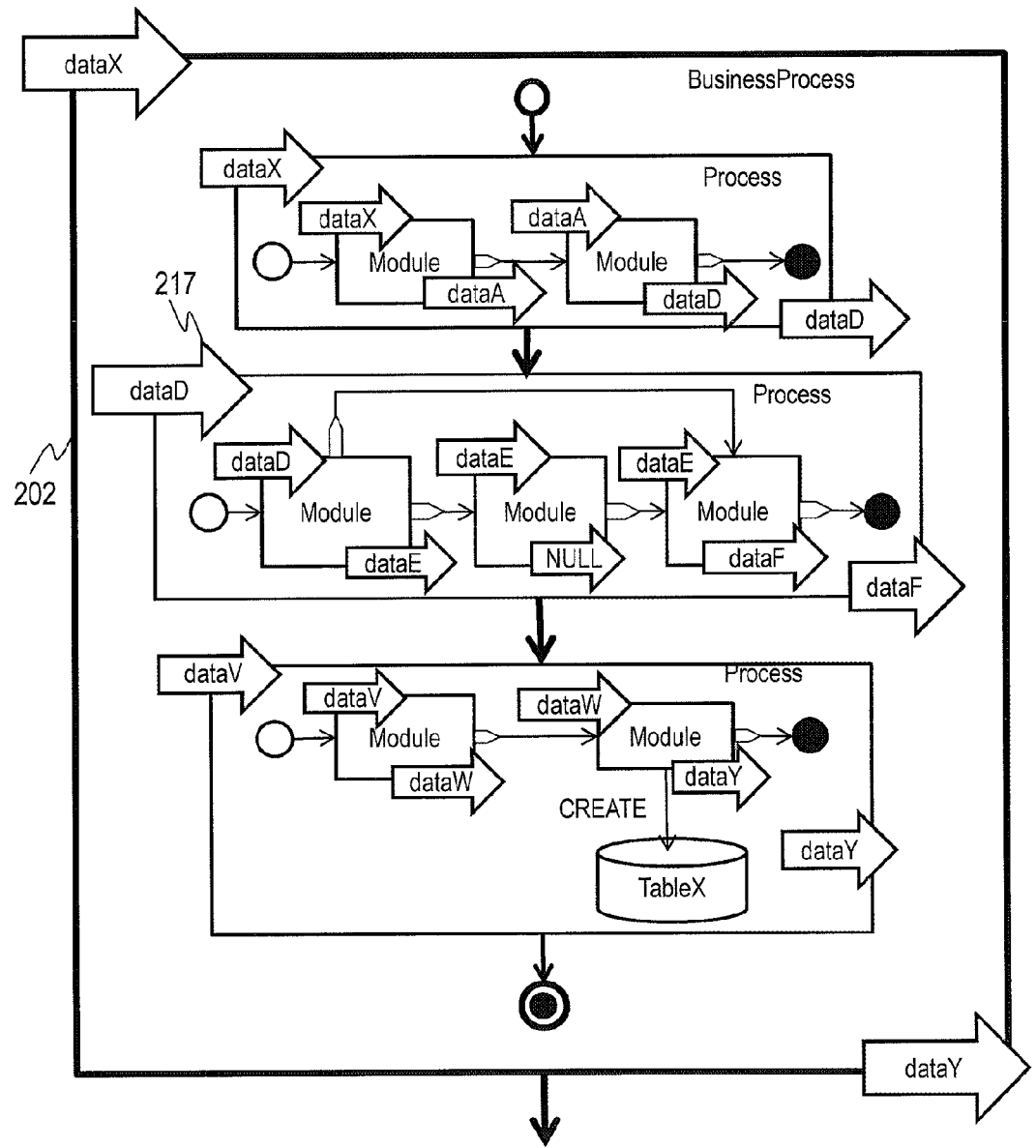
FIG. 3B is an enlarged views of the process units of the business process according to the embodiment of this invention.
Figure 3C:
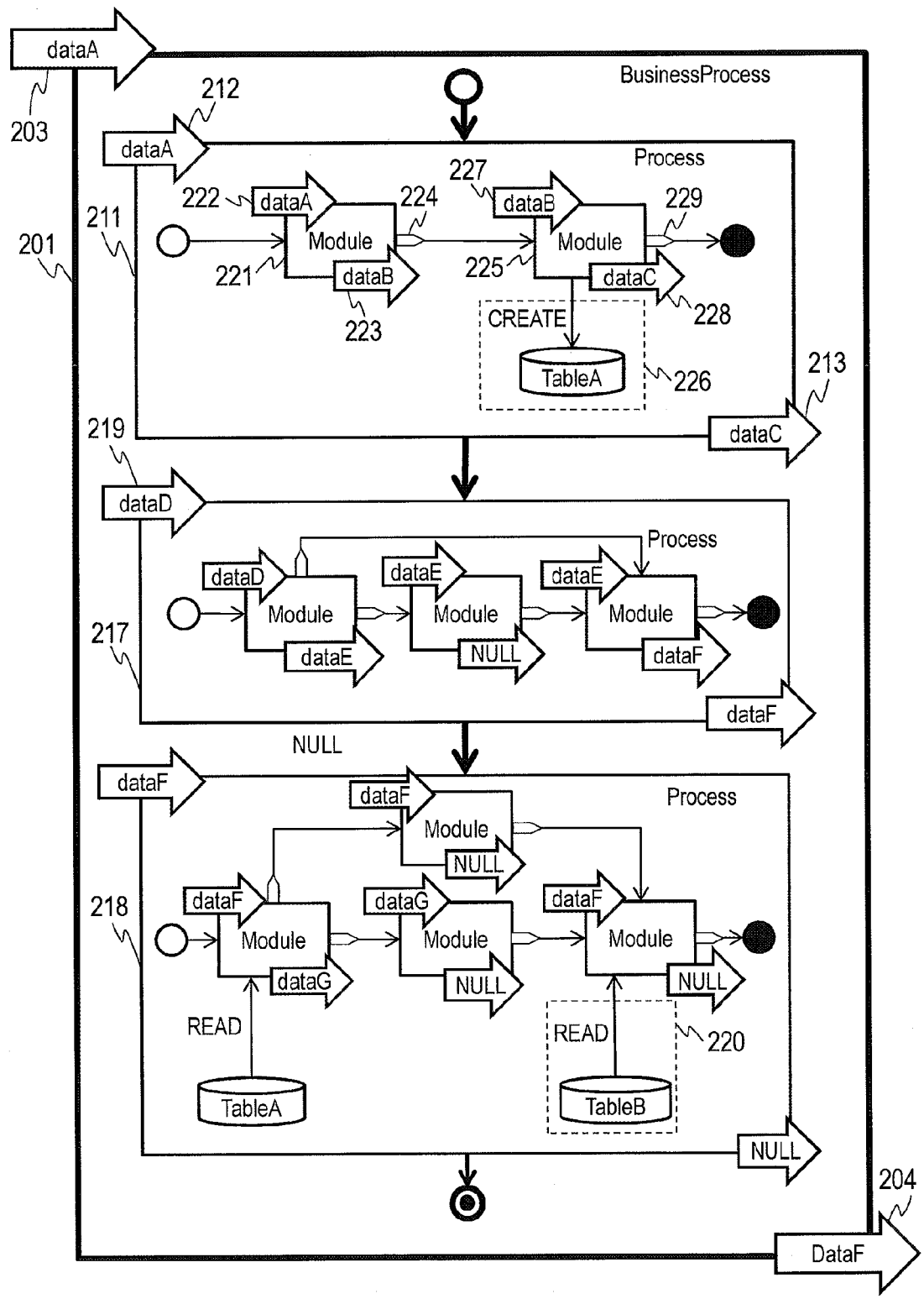
FIG. 3C is an enlarged views of the process units of another business process according to the embodiment of this invention.

FIGS. 3A to 3C illustrate business processes as an example of an application developed by using the event control infrastructure. FIG. 3A is an exploded view illustrating an example of process units of the business processes. FIGS. 3B and 3C are enlarged views of the process units of the business process. Business processes 201 and 202 are each performed by the application server 103.

A plurality of processes (process units such as registration of a contractor) are coupled in series to the business process 201 (process unit such as a new contract) illustrated in FIGS. 3A and 3C. Each of the provided processes includes at least one of set of module (process unit such as registration of a contract table). The modules of the process are not necessarily coupled in series, but the coupling may involve branching so that some modules may not be performed depending on a condition.

First, in the business process 201, a process 211, a process 217, and a process 218 are sequentially performed in order with data 203 (data A) as input information and data 204 (data F) as output information.

Further, the business process 202 illustrated in FIGS. 3A and 3B is always performed at the time of performing the business process 201. (The business process 202 is hereinafter referred to as "premise business process.) The application server 103 uses the process 217 in common in the business processes 201 and 202.

Next, the process 211 that is performed in the business process 201 has internal modules 221 and 225 performed in order by the application server 103 with data 212 (data A=203) as input information and data 213 (data C) as output information.

Next, the process 221 that is performed in the business process 211 is output through an output port 224 with data 222 (data A=212) as input information and data 223 (data B) as output information.

Next, the module 225 that is performed in the business process 211 creates Table A as processing 226 and is output through an output port 229 with data 227 (data B=223) as input information and data 228 (data C=213) as output information.

FIGS. 4A to 4D illustrate examples representing the business processes 201 and 202 of FIGS. 3A to 3C in the form of java interface files, which are to be coded by the application developer. In FIGS. 4A to 4D, each description starting at "@" is an annotation.

FIG. 4A illustrates an example of a java interface file indicating the business process 201 illustrated in FIGS. 3A and 3C. The contents of the description of the java interface file of the business process 201 are described below.

A boxed text 301 indicates that the business process 201 contains the business process 202 as a premise business process including a process or a module used by the business process 201.

A boxed text 203 indicates the data A as input information for the business process 201.

A boxed text 204 indicates the data B as output information for the business process 201.

A boxed text 302 indicates the processes 211, 217, and 218 that are performed by the business process 201, and the execution order.

FIG. 4B illustrates an example of a java interface file indicating the business process 211. The contents of the description of the java interface file of the process 211 are described below.

A boxed text 212 indicates the data 212 (data A=203) as input information for the process 211.

A boxed text 213 indicates the data 213 (data C=228) as output information for the process 211.

A boxed text indicates that the first module that is performed in the process 211 is the module 221.

A boxed text 322 indicates transition to the module 225 when the module 221 is "pass (output port 224)" in the process 211.

A boxed text 323 indicates transition to the end of the process 211 when the module 225 is "pass (output port 229)" in the process 211.

FIG. 4C illustrates an example of a java interface file indicating the module 221. The contents of the description of the java interface file of the module 221 are described below.

A boxed text 222 indicates the data 222 (data A=203) as input information for the module 221.

A boxed text 223 indicates the data 223 (data B=227) as output information for the module 221.

A boxed text 224 indicates the output port 224 of the module 221.

FIG. 4D illustrates an example of a java interface file indicating the module 225. The contents of the description of the java interface file of the module 225 are described below. A boxed text 226 indicates that Table A is created by create, read, update, and delete (CRUD) information of the module 225.

A boxed text 227 indicates the data 227 (data B=223) as input information for the module 225.

A boxed text 228 indicates the data 228 (data C=213) as output information for the module 225.

A boxed text 229 indicates the output port 229 of the module 225.

Figure 5:
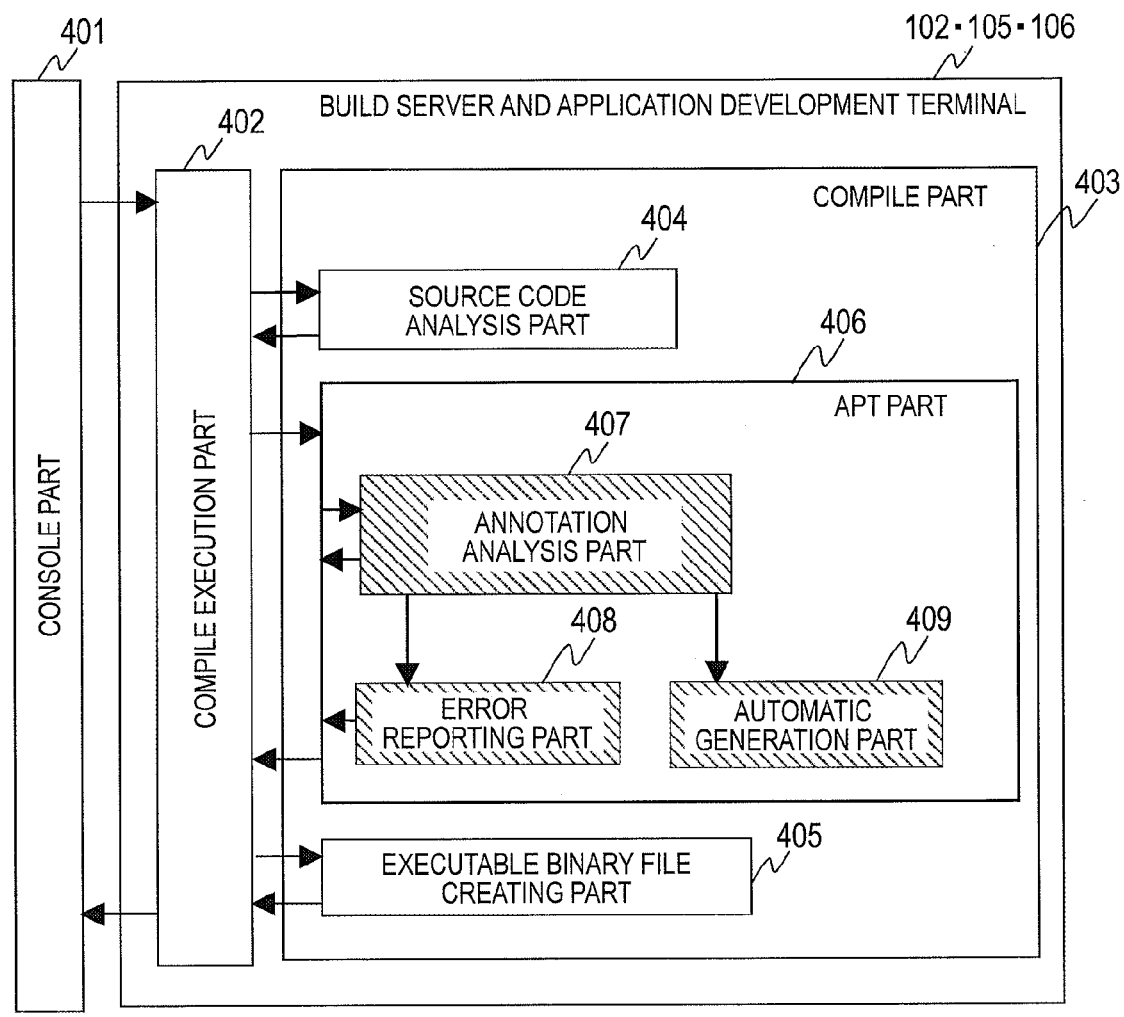
FIG. 5 is a block diagram of a compiler according to this invention, which is performed by the application development terminals and the build server according to the embodiment of this invention.

FIG. 5 is a block diagram of a compiler according to this invention, which is performed by the application development terminals 105 and 106, and the build server 102.

A console part 401 includes an input apparatus and an output apparatus (neither shown). In response to a compile request received by the console part 401, a compile execution part 402 and a compile part 403 function to compile a source file inside the local storage in a case of the application development terminal 105 or 106, and compile a source file acquired from the repository server 101 and stored in the local storage in a case of the build server 102. The compiler includes the compile execution part 402 and the compile part 403.

The compile execution part 402 invokes a source code analysis part 404, an Annotation Processing Tool (APT) part 406, and an executable binary file creating part 405, which construct the compile part 403 and are basic components of java compiling, to create an executable binary file from the acquired source file.

The APT part 406 activates an annotation analysis part 407 unique to this invention, which functions to perform a manipulation on the java interface files illustrated in FIGS. 4A to 4D. The annotation analysis part 407 acquires an annotation of a java interface file, and performs validation of the input/output information in data and validation of the CRUD information, which is manipulation information for a table or the like. When there is report information (error or warning), the annotation analysis part 407 issues a report request to an error reporting part 408.

The annotation analysis part 407 determines the contents of the report information. When determining that automatic generation is possible, the annotation analysis part 407 outputs an automatic generation request 608 for the source file to an automatic generation part 409. A configuration diagram for performing this compiler is described referring to FIG. 6, and a sequence diagram at the time of performing the compiler is described referring to FIGS. 7 and 8.

Figure 6:
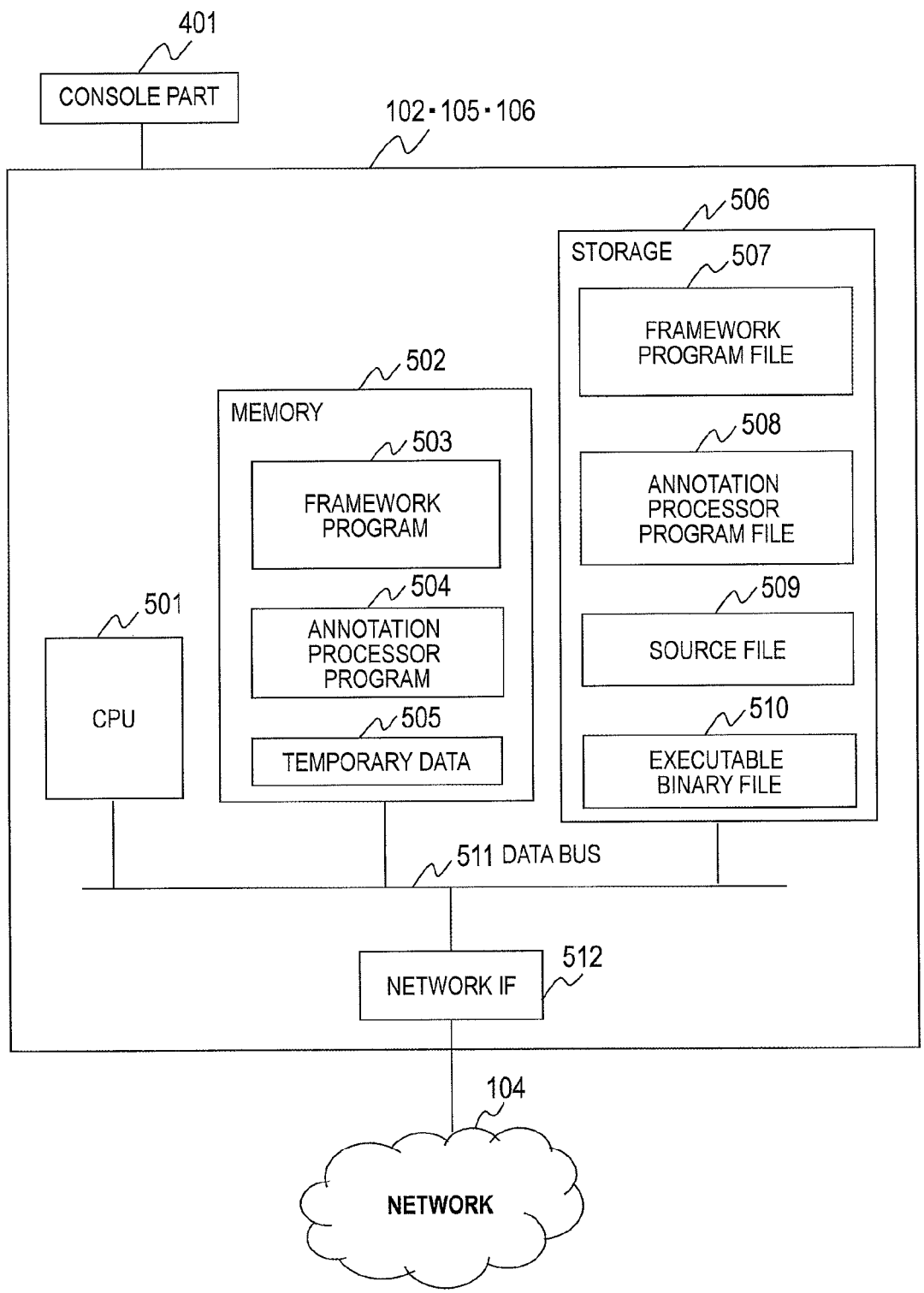
FIG. 6 is a block diagram illustrating one example of the functions of each of the application development terminals and the build server according to the embodiment of this invention.

FIG. 6 is a block diagram illustrating one example of the functions of each of the application development terminals 105 and 106 and the build server 102 to control the compile execution part 402 and the compile part 403 as the compiler of FIG. 5 to function.

Because the application development terminals 105 and 106 and the build server 102 have the same configuration, the configuration of the application development terminal 105 is described below.

The application development terminal 105 includes a CPU 501, a memory 502, a storage 506, and a network interface 512 connected by a data bus 511 so that the components communicate to/from one another via the data bus 51. The network interface 512 is coupled to the network 104. The application development terminal 105 is also connected to the console part 401 including the input apparatus and the output apparatus.

The individual functional blocks illustrated in FIG. 5 are normally stored in the storage 506 as files. In other words, the compile execution part 402, the source code analysis part 404, and the executable binary file creating part 405 are stored in a framework program file 507, and the annotation analysis part 407, the error reporting part 408, and the automatic generation part 409 are stored in an annotation processor program file 508.

At the time of actually performing compiling, the respective functional blocks are deployed from the respective storage locations in the storage 506 into the memory 502 via the data bus 511 in response to a command from the CPU 501, and are performed by the CPU 501.

In FIG. 6, the framework program file 507 is deployed as a framework program 503 in the memory 502, and the annotation processor program file 508 is deployed as an annotation processor program 504 to perform the compile execution part 402. An executable binary file 510 and a source file 509 in the storage 506 are created as results of performing the compile execution part 402.

When the source file 509 is created, the compile execution part 402 is performed again on the source file 509. Temporary data 505 is a temporary storage, and is deleted after the compile execution part 402 is performed.

The network interface 512 establishes communication to/from each terminal illustrated in FIG. 1 over the network 104.

Data necessary when an individual part is performed is stored in the temporary data 505 and the storage 506. The temporary data 505 is read and updated as needed.

Figure 7A:
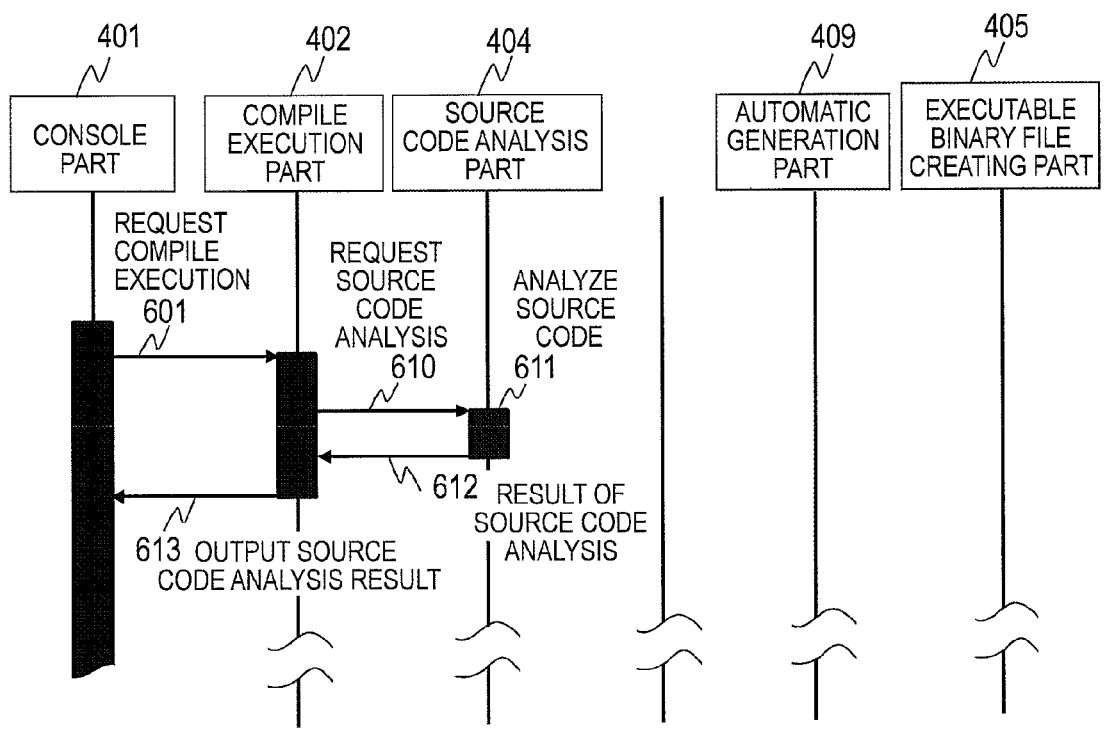
FIG. 7A is a sequence diagram when a compile target is normal or gives warning at the time according to the embodiment of this invention.
Figure 7B:
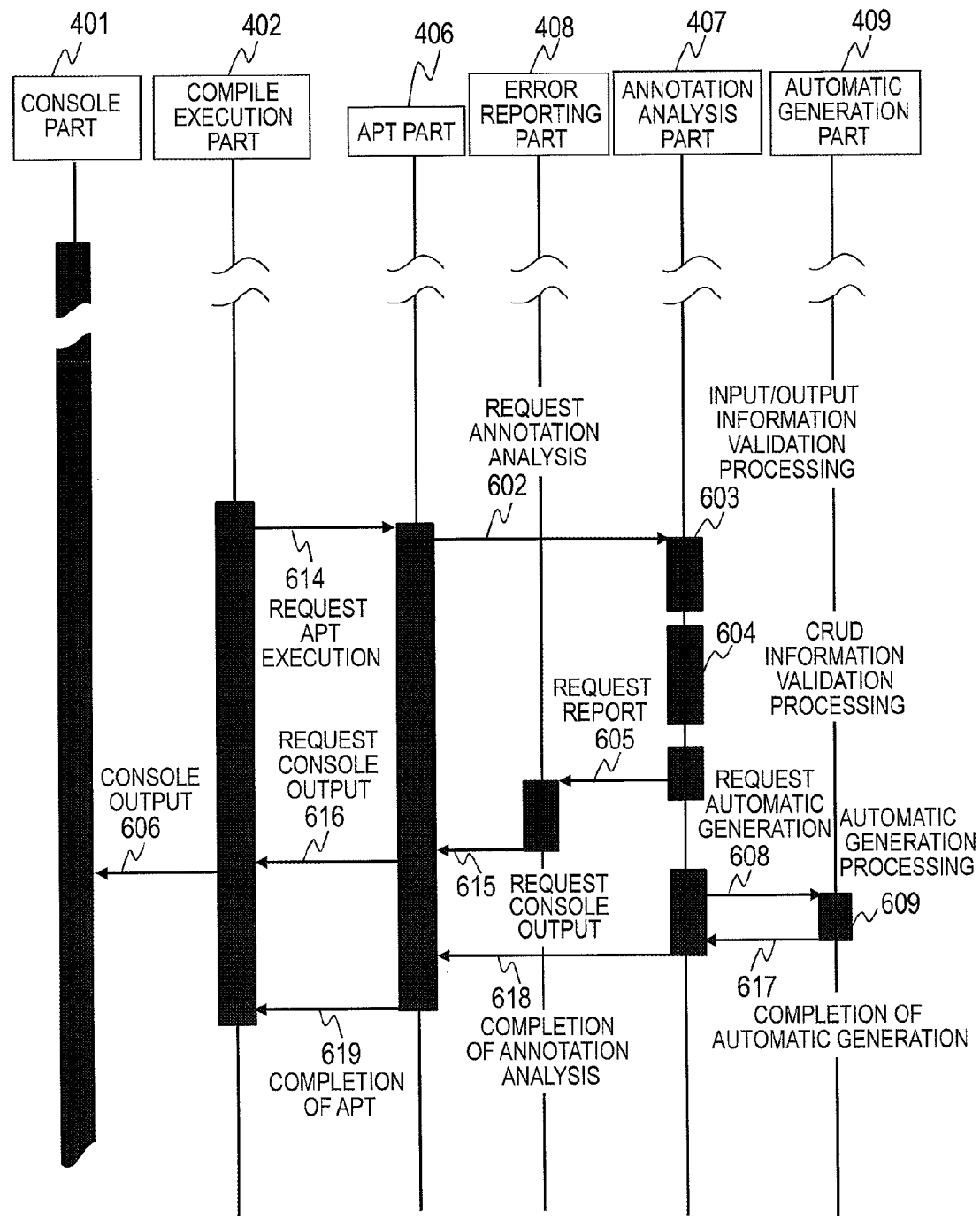
FIG. 7B is a sequence diagram when a compile target is normal or gives warning at the time according to the embodiment of this invention.
Figure 7C:
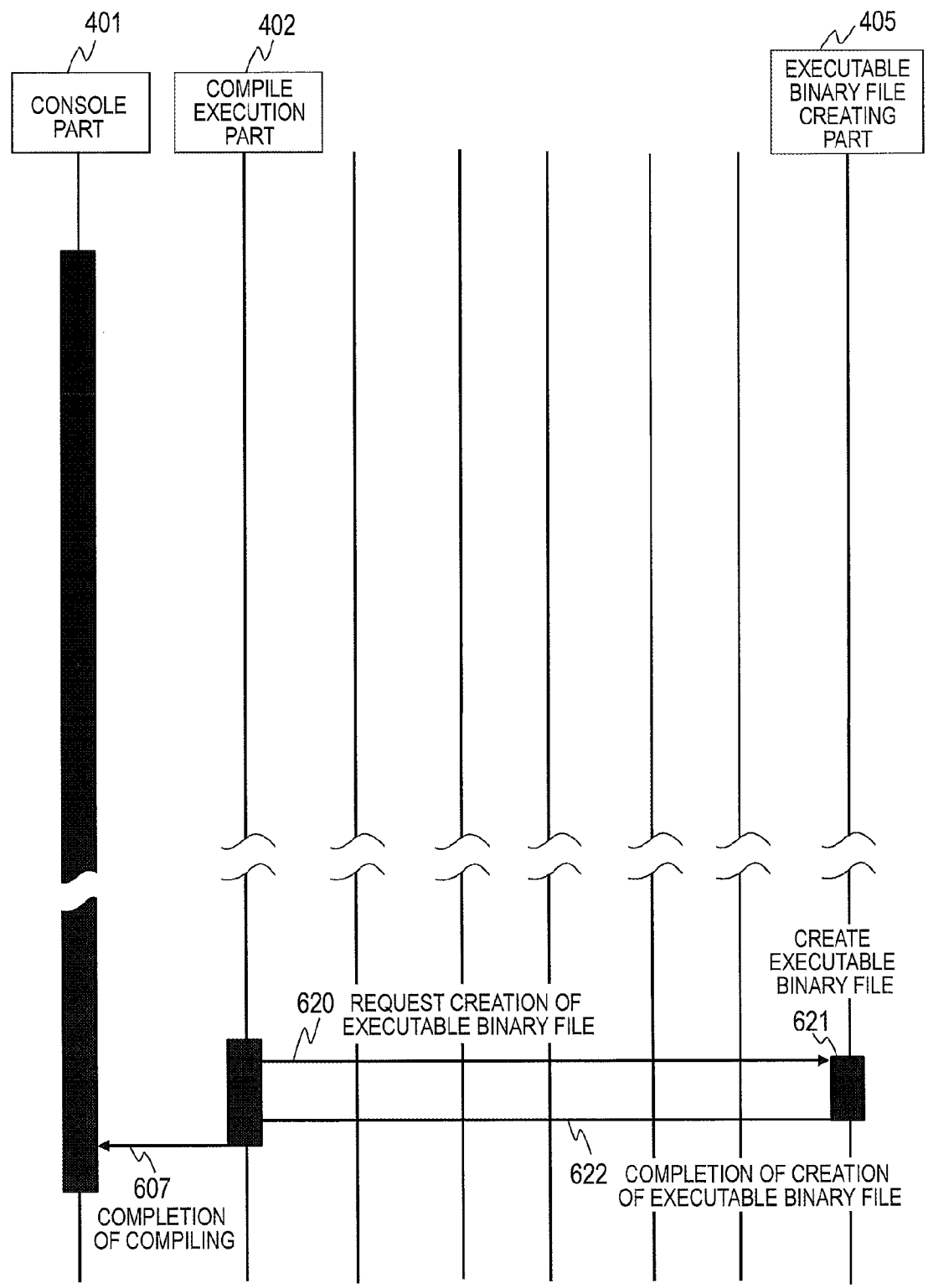
FIG. 7C is a sequence diagram when a compile target is normal or gives warning at the time according to the embodiment of this invention.

FIGS. 7A to 7C are sequence diagrams when a compile target is normal or gives warning at the time the compile part 403 of FIG. 5 is performed.

First, in Step 601, the console part 401 makes a compile execution request to the compile execution part 402. To cause the console part 401 to display the progress of compiling, the compile execution part 402 outputs a source code check result output in Step 613, a console output in Step 606, and compile completion in Step 607. The console part 401 receives and displays those outputs.

In Step 610, the compile execution part 402 having received the compile execution request makes a source code analysis request to the source code analysis part 404. The source code analysis part 404 having received the source code analysis request performs source code analysis of the source file 509 in Step 611, and returns the result of source code analysis to the compile execution part 402 in Step 612. In Step 613, the compile execution part 402 having received the source code analysis result outputs the source code analysis result to the console part 401.

Then, in Step 614, the compile execution part 402 makes an APT execution request to the APT part 406. In Step 602, the APT part 406 having received the APT execution request makes a request for annotation analysis of the source file 509 to the annotation analysis part 407.

The annotation analysis part 407 having received the annotation analysis request performs input/output information validation processing in Step 603, and CRUD information validation processing in Step 604. When report information, which represents the results of the validation processes in Steps 603 and 604, is warning, the annotation analysis part 407 makes a report request to the error reporting part 408 in Step 605.

When receiving a report request for warning in the input/output information validation processing or the CRUD information validation processing, the error reporting part 408 makes a console output request to the APT part 406 in response to the received report request in Step 615. Further, the APT part 406 makes a console output request to the compile execution part 402 in Step 616, and the compile execution part 402 makes a console output to the console part 401 in Step 606.

Next, in Step 608, the annotation analysis part 407 makes an automatic generation request to the automatic generation part 409. The automatic generation part 409 having received the automatic generation request creates an automatically generated source through the automatic generation processing in Step 609.

When the automatic generation part 409 finishes the processing, in Step 617, the automatic generation part 409 returns completion of automatic generation to the annotation analysis part 407. In Step 618, the annotation analysis part 407 having received the automatic generation completion reports the completion of annotation analysis to the APT part 406. In Step 619, the APT part 406 having received the report of annotation analysis completion reports completion of APT to the compile execution part 402.

Next, in Step 620, the compile execution part 402 makes a binary file creation request to the executable binary file creating part 405. In Step 621, the executable binary file creating part 405 having received the executable binary file creation request generates data set such as the source file 509 analyzed in Step 611, an executable binary file for the automatically generated source created in Step 609, and a table to be used in the business process. The executable binary file creating part 405 returns completion of creation of the executable binary file to the compile execution part 402 in Step 622, and reports completion of compiling to the console part 401 in Step 607.

Figure 9:
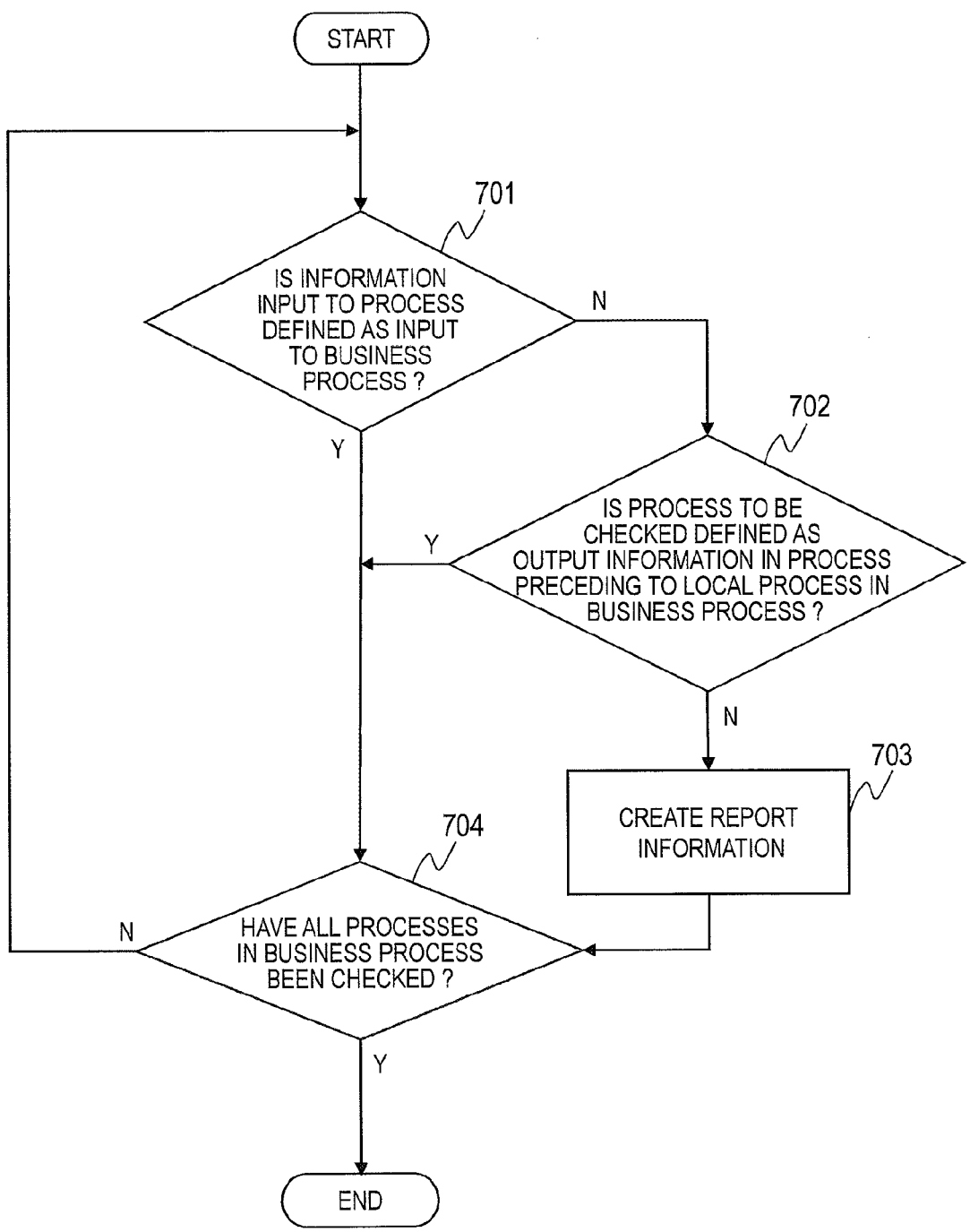
FIG. 9 is a flowchart of the input/output information validation of data according to the embodiment of this invention.
Figure 10:
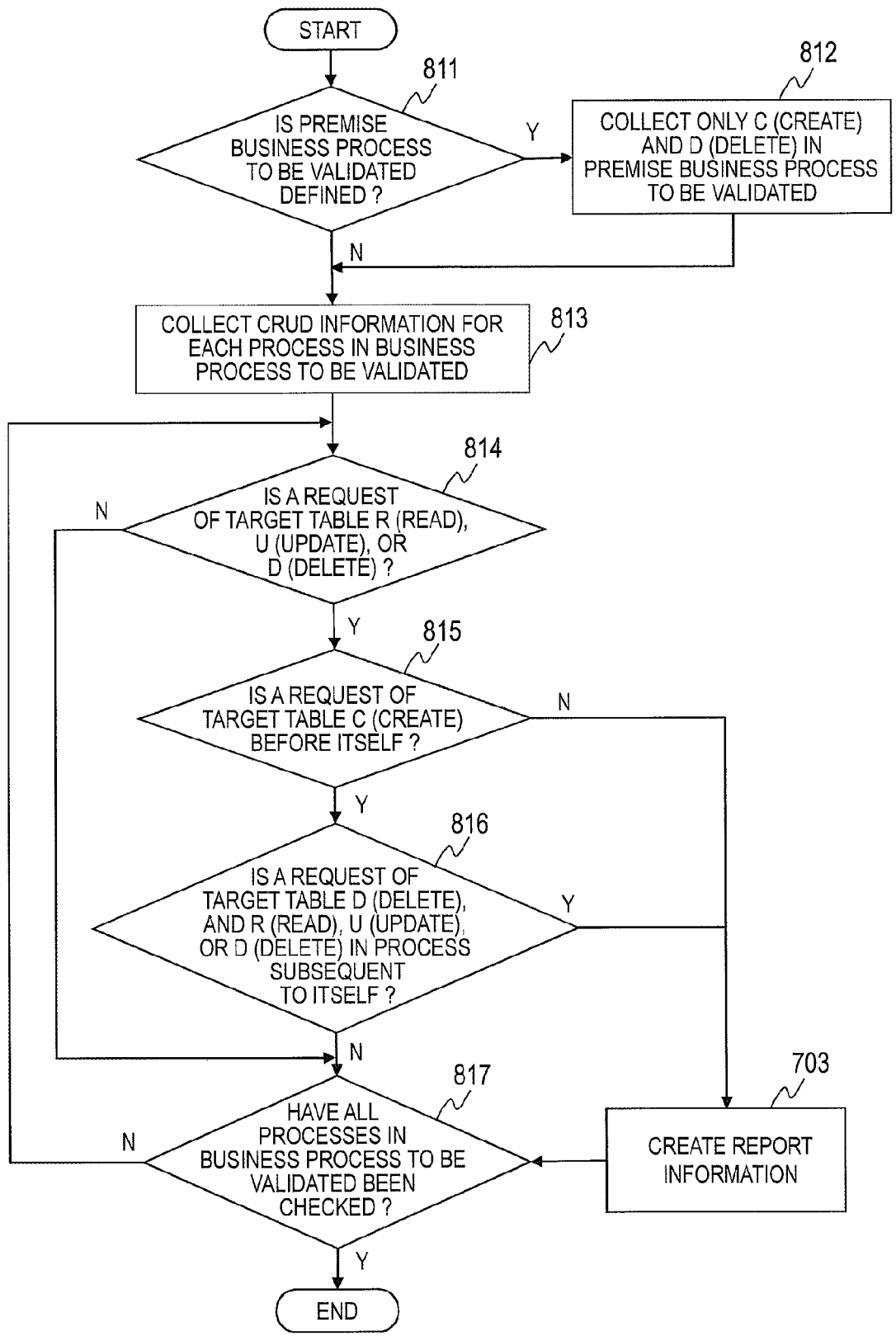
FIG. 10 is a flowchart of the CRUD information validation that is performed by the annotation analysis part according to the embodiment of this invention.
Figure 13:
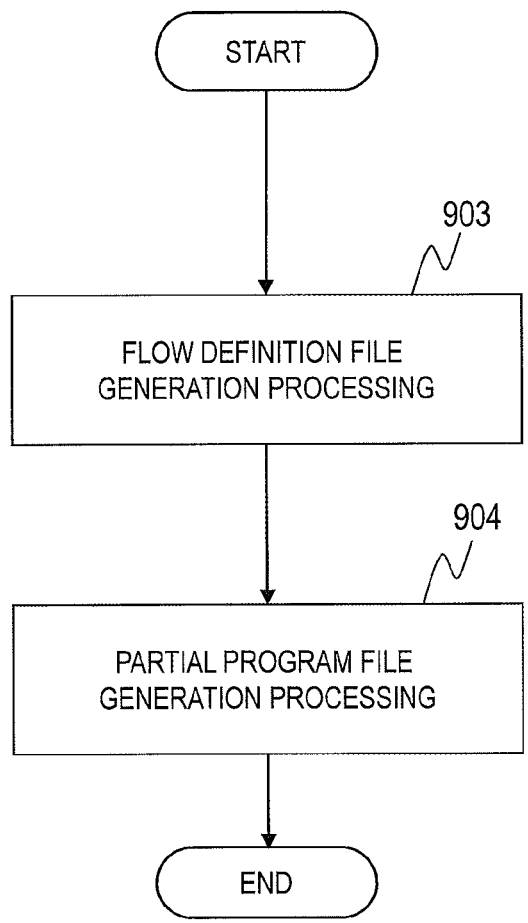
FIG. 13 is a flowchart illustrating an example of the automatic generation processing according to the embodiment of this invention.

The input/output information validation processing that is performed in Step 603 of FIG. 7B is illustrated in FIG. 9, the CRUD information validation processing that is performed in Step 604 of FIG. 7B is illustrated and shown in FIGS. 10 to 12, and the automatic generation processing that is performed in Step 609 of FIG. 7B is described referring to a flowchart illustrated in FIG. 13.

Figure 8:
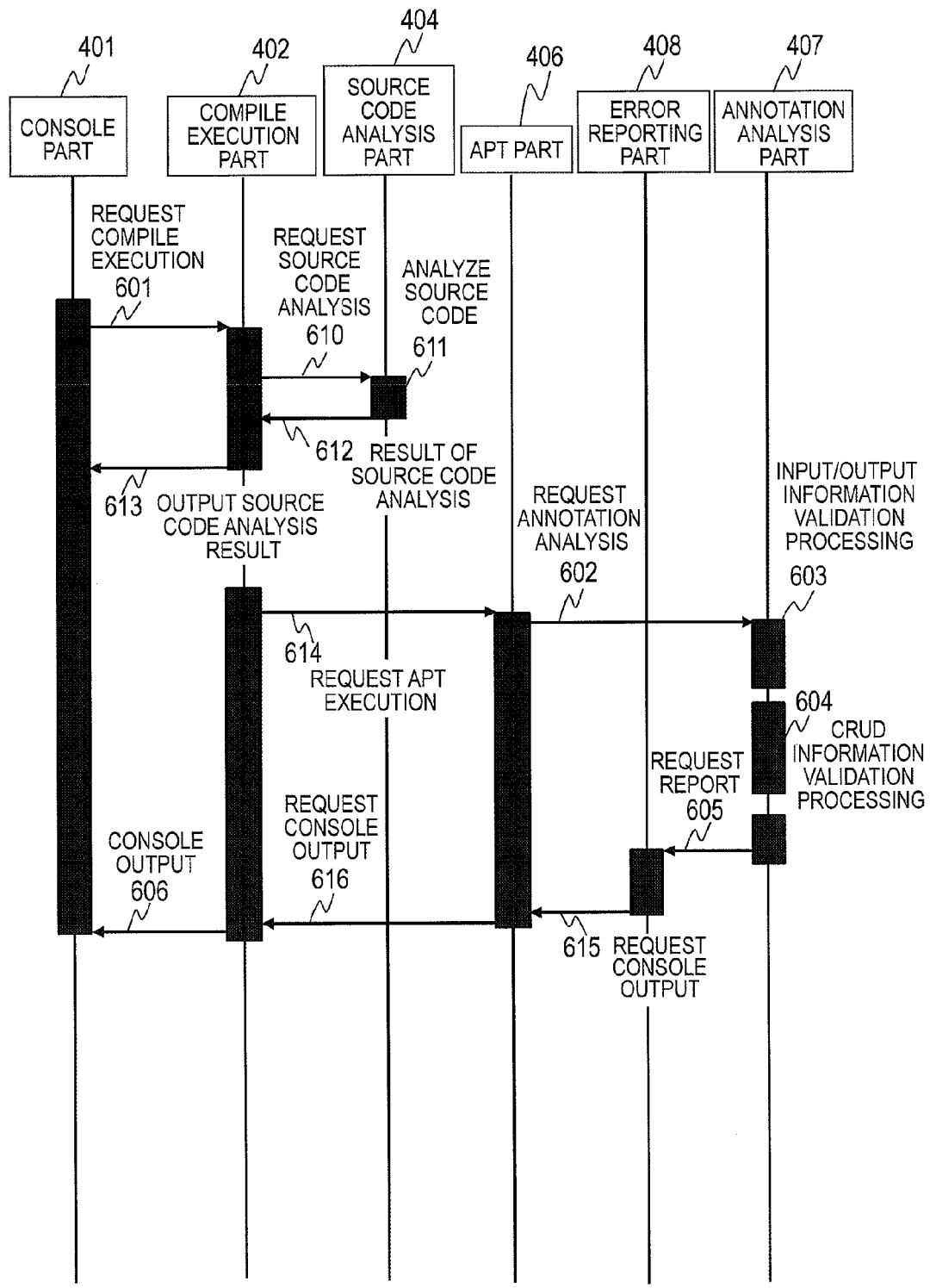
FIG. 8 is a sequence diagram when a compile target is in error at the time according to the embodiment of this invention.

FIG. 8 is a sequence diagram when a compile target is in error at the time the compile execution part 402 of FIG. 5 processes the source file 509. The processing from the compile execution request in Step 601 to the console output in Step 606 is the same as the processing illustrated in FIG. 7B.

When the input/output information validation processing in Step 603 or the CRUD information validation processing in Step 604 is in error, the processing is terminated without performing the processing of and following the automatic generation request in Step 608 illustrated in FIG. 7B, and hence an executable binary file relating to the automatically generated source and the compile target is not created.

FIG. 9 is a flowchart of the input/output information validation of data that is performed by the annotation analysis part 407 illustrated in FIGS. 7A to 7C and 8, and is activated for each of the java interface files (FIG. 4A) of the business processes 202 and 201 illustrated in FIGS. 3A to 3C.

First, the annotation analysis part 407 determines in Step 701 whether data (variable) defined as input information of a process is defined as input information of a business process. This determination is made by checking whether the type of the defined variable matches the variable name.

When there is an item, as input information of the business process, for which the type of the defined variable matches the variable name, the annotation analysis part 407 proceeds to Step 704. When there is not such a matching item, on the other hand, the annotation analysis part 407 proceeds to Step 702.

Then, the annotation analysis part 407 determines in Step 702 whether a process to be checked in the business process is defined as output information of a process preceding this process by checking whether the type of the defined variable matches the variable name.

When there is an item for which the type of the defined variable matches the variable name, the annotation analysis part 407 proceeds to Step 704. When there is not such a matching item (corresponding to data 219 as the input information for the process 217 of FIG. 3A), on the other hand, the annotation analysis part 407 proceeds to Step 703.

Next, in Step 703, the annotation analysis part 407 creates report information such as an error in a manner described later, and then proceeds to Step 704.

In next Step 704, the annotation analysis part 407 determines whether input/output information for all the processes in the business process has been checked. When there is any process whose input/output information has not been checked yet, the annotation analysis part 407 returns to Step 701 to repeat the above-mentioned processing. When the checking has been finished for all the processes, the annotation analysis part 407 terminates this processing. It should be noted that although not shown, similar processing is also performed for the process and modules within the process.

Through the above-mentioned processing, when the input information of data to be used in a process is not defined as input information of the business process and output information corresponding to the input information is not defined in another process in the business process, the information cannot be input in the business process, and hence the annotation analysis part 407 determines that the result of checking the input/output information is invalid, and can issue report information such as an error.

FIG. 10 is a flowchart of the CRUD information validation that is performed by the annotation analysis part 407 illustrated in FIGS. 7A to 7C and 8, and is activated for each of the java interface files (FIG. 4A) of the business processes 202 and 201. The CRUD information validation is information on a manipulation for data set such as a table to be used by a process or a module.

First, in Step 811, the annotation analysis part 407 determines whether a premise business process for a business process to be validated is defined. When the premise business process (business process 202 of FIG. 3A) is defined, the annotation analysis part 407 proceeds to Step 812, whereas when the premise business process is not defined, the annotation analysis part 407 proceeds to Step 813.

In next Step 812, the annotation analysis part 407 collects information only for C (Create) and D (Delete) included in the premise business process for the business process to be validated. Then, the annotation analysis part 407 performs general information collection after collecting information for each process of the premise business process, and treats the collected information not as information to be validated, but as premise CRUD information of the business process to be validated.

When the premise business process for the business process to be validated further has a premise business process, CRUD information is likewise collected. D (Delete) means physical deletion and logical deletion. With regard to this information collection, an example of the pattern of a manipulation for a single table is shown in FIG. 11. It should be noted that the flow of processes involves branching, and hence the scheme of collecting CRUD information for each process includes searching all branches for maximum CRUD information as a collection result.

In next Step 813, the annotation analysis part 407 collects CRUD information for each process in the business process to be validated. Although the scheme of collecting CRUD information for each process is similar to the one in Step 812, CRUD information to be collected, unlike the one in Step 812, is collected in such a way that because information for CRUD information striding over a process is collected, C (Create) and D (Delete) in the table are always collected, but information for R (Read) and U (Update) is collected only when R and U cannot be solved within the local process, and the collected information is arranged in the order of the processes to be executed.

Next, in Step 814, the annotation analysis part 407 sequentially determines as which one of R (Read), U (Update), and D (Delete) the table manipulation corresponding to the CRUD information collected in Step 813 is defined.

The annotation analysis part 407 proceeds to Step 815 when the table manipulation matches one of R (Read), U (Update), and D (Delete), but proceeds to Step 817 when the table manipulation does not have a match. Next, in Step 815, the annotation analysis part 407 determines whether C (Create) of the table to be manipulated in Step 814 is performed within a process preceding the local process. As a result of this determination, when C (Create) of the table to be manipulated in Step 814 is performed within a process preceding the local process, the annotation analysis part 407 proceeds to Step 816.

When C (Create) of Table A to be manipulated is not performed within a process preceding the local process (corresponding to processing 220 that reads Table B in the process 218 of FIG. 3A), on the other hand, the annotation analysis part 407 proceeds to Step 703. In Step 703, the annotation analysis part 407 generates an error or warning as report information for the manipulation (R) for a table which is not created.

Next, in Step 816, the annotation analysis part 407 determines whether the manipulation for the target table is D (Delete), and C (Create) is not involved and R (Read), U (Update), or D (Delete) is performed in a subsequent process. The annotation analysis part 407 proceeds to Step 817 when there is no manipulation for the table that remains deleted, but proceeds to Step 703 when there is a manipulation for the table that remains deleted.

In Step 703 whose processing is similar to that of Step 703 of FIG. 9, the annotation analysis part 407 generates report information, such as an error and warning, for the manipulation for the table that remains deleted.

In next Step 817, the annotation analysis part 407 determines whether the processing is finished for every piece of CRUD information of the business process to be validated, which is collected in Step 813. When there is CRUD information which has not been processed yet, the annotation analysis part 407 returns to Step 814 to repeat the above-mentioned processing. When the processing is finished for every piece of CRUD information, the processing is terminated. With regard to validation of this CRUD information, an example of the pattern of report information for a single table is shown in FIG. 12.

FIG. 11 shows a pattern of collection of CRUD information of a premise business process to be validated in Step 812 of FIG. 9 for a single table. Examples of the pattern include a pattern where a premise business process further includes a premise business process. The examples of the patterns are described below item number by item number. It should be noted that the result of collection of CRUD information is stored in, for example, the memory 502.

Referring to FIG. 11, the result of collection of CRUD information has each entry including an item number 1101 for identifying a pattern, a first manipulation 1102 in the business process, a second manipulation 1103 in the business process, a third manipulation 1104 in the business process, and a general collection result 1105.

Item number 1 is assumed to be a business process of a manipulation like addition in a table, such as a new contract, so that the collection result is "C (Create)".

Item number 2 is assumed to be a business process of a manipulation like deletion in a table, such as cancellation of a contract, so that the collection result is "–(Null)".

Item number 3 is assumed to be an update-based business process, such as a change to create a table after deletion of a table, so that the collection result is "C (Create)".

Item number 4 is a pattern involving successive deletion of tables, with creation as the last manipulation, and hence, like Item number 3, is assumed to be an update-based business process so that the collection result is "C (Create)".

Item number 5 is assumed to be a pattern in which the first manipulation is a business process for addition in a table and the second manipulation is a deletion-based business process so that the collection result is "–(Null)".

Item number 6 is assumed to be a pattern in which the first manipulation is a business process for addition in a table, and the second and third manipulations are update-based business processes so that the collection result is "C (Create)".

Item number 7 is assumed to be a pattern in which the first manipulation is a business process for addition in a table, and the second and third manipulations are update-based business processes so that the collection result is "C (Create)".

Although the description has been given of an example where a premise business process includes three business processes (or modules), which is not limitative, a premise business process may include an arbitrary number of business processes or modules.

Although the description has been given of an example where handling a table as an example of data set of collecting manipulation information, handling a sequence or variables is also an example of data set.

FIG. 12 shows the relation between patterns of the collection result of FIG. 11 and the collection result for a business process to be validated, and report information. The examples of the patterns are described below item number by item number. It should be noted that report information corresponding to a validation pattern is stored in, for example, the memory 502.

Referring to FIG. 12, report information corresponding to a validation pattern has each entry including an item number 1201 for identifying a pattern, a collection result 1202 for storing the collection result of FIG. 11, a collection result 1203 in a first business process, a collection result 1204 in second and subsequent business processes, and report information 1205 corresponding to the pattern of the collection result.

For Item number 1, it can be assumed that a business process for which report information is to be set is a table-adding business process such as a new contract, and hence the report information is "–(Null)". It is assumed that the second and subsequent items (1204) in CRUD collection have the same pattern for the sequence of R (Read) or U (Update).

For Item number 2, it can be assumed that a premise business process is a table-adding pattern such as a new contract, and a business process for which report information is to be set is a table-adding business process such as an additional contract, and hence the report information is "–(Null)". It is assumed that the second and subsequent items (1204) in CRUD collection have the same pattern for the sequence of R (Read) or U (Update).

For Item number 3, it can be assumed that a premise business process is a table-adding pattern such as a new contract, and a business process for which report information is to be set is a table-deletion business process such as cancellation of a contract, and hence the report information is "–(Null)".

For Item number 4, it can be assumed that a premise business process is a table-adding pattern such as a new contract, and a business process for which report information is to be set is a table-updating business process such as a change of a table, and hence the report information is "–(Null)".

Item number 5 is a pattern of a business process similar to the pattern of Item number 3. However, although R (Read), U (Update), or D (Delete) is performed after deleting a table, it is assumed that logical deletion is the target, and hence report information is "warning".

Item numbers 6 and 7 are business processes for which report information is to be set and show patterns in which D (Delete) is performed after C (Create) of a table and which cannot be assumed to a single business process, and hence report information is "error".

As described above, validation of input/output information of a business process and validation of CRUD information thereof are performed to validate the input/output information of processes constructing the business process and check validate manipulations for data set to be used, and when the validation results are invalid, in other words, for unexpected manipulations, report information of an error is generated, and for manipulations that can be performed depending on a condition, report information of warning is generated.

Accordingly, in a case where partial alteration of a business process changes the prerequisite of the common process (217), a correction work only needs to be carried out when report information of an error or warning originates from validation of input/output information and validation of CRUD information, which are performed by the annotation analysis part 407. This makes it possible to efficiently develop (or correct) a loosely-coupled business process.

When report information is an error, inhibition of generation of an executable binary file can avoid wasteful execution of a unit test, thus shortening the development period of a loosely-coupled business process and reducing the work needed for the development.

FIG. 13 is a flowchart illustrating an example of the automatic generation processing of Step 609 that is performed by the automatic generation part 409 of FIG. 7B.

First, in Step 903, when a business process is the target to be automatically generated, the automatic generation part 409 performs processing of generating a file (flow defining file) representing the order of execution of processes in the target business process, whereas when a process is the target to be automatically generated, the automatic generation part 409 performs processing of generating a file (flow defining file) representing the order of execution of modules within this process, after which the processing proceeds to Step 904.

Next, in Step 904, the automatic generation part 409 performs processing of generating the source of an individual program for managing inputs and outputs of the target business process or the target process, and then terminates the automatic generation processing. It should be noted that this processing is activated for each java interface file of a business process, a process, and a module. The generated automatically generated source is stored in the memory 502 or the storage 506. Alternatively, the generated automatically generated source may be added to the source file 509.

The above-mentioned processing can generate an automatically generated source as an individual program for managing inputs and outputs of a business process or a process based on the flow defining file representing the order of execution of processes in a business process or the order of execution of modules within a process. The automatically generated source describes data set such as a table to be manipulated described in the source file 509.

As illustrated in FIG. 7A to 7C, the executable binary file creating part 405 adds data set such as a table to be manipulated described in the automatically generated source in addition to the executable binary file 510 in the source file 509 to generate the executable binary file 510.

Therefore, in the unit test of Step 125 of FIG. 2, the application development terminal 105 can automatically generate a table or the like needed for processing through compiling without requiring preparation of the table beforehand by a developer, thus ensuring quick execution of the executable binary file 510.

For example, for the process 211 constructing the business process 201 illustrated in FIG. 3C, the module 225 creates Table A in a process 226. Then, Table A is read in a different process 218. The process becomes that of Item number 1 in the pattern of collecting CRUD information in the business process shown in FIG. 12, and hence the automatic generation part 409 adds a source code to generate Table A which is read by the process 218 to the automatically generated source.

Then, as illustrated in FIG. 2, performing the compile 123 at the application development terminal 105 generates an executable binary file corresponding to the business process and Table A as data to be input and output in the business process. Accordingly, the developer who operates the application development terminal 105 can quickly perform a unit test 125 without manually preparing Table A.

CONCLUSION

As described above, a business process and processes or modules constructing the business process are handled as java interface files as illustrated in FIGS. 4A to 4D, and input/output information and CRUD information are defined in these java interface files by using annotations. The application development terminal 105 or the compiler (compile execution part 402 and compile part 403) of the repository server 101 receives an interface file to which input/output information and CRUD information are added. Then, the compile part 403 has an annotation processor, which is the extended function of a Java compiler, as the annotation analysis part 407, and analyzes the interface file by using the annotation analysis part 407 to validate the input/output information and CRUD information. When the results of the validation of input/output information and validation of CRUD information are valid, the annotation analysis part 407 automatically generates the source and generates an executable binary file. When the results of the validation of input/output information and validation of CRUD information are invalid, on the other hand, the annotation analysis part 407 inhibits automatic generation of the source and generation of an executable binary file, and outputs report information to the console part 401.

Through the above-mentioned processing, input/output information of processes or modules constructing a business process is validated and a operation for data set is validated, and for a manipulation that brings about an invalid validation result, report information of an error is generated, whereas for a operation that can be performed depending on a condition, report information of warning is generated.

Accordingly, in a case where partial alteration of a business process changes the prerequisite of the common process, a correction work only needs to be carried out when report information of an error or warning originates from validation of input/output information and validation of CRUD information, which are performed by the annotation analysis part 407, in the analysis of the source file 509. This makes it possible to efficiently develop (or correct) a loosely-coupled business process. Particularly, overlooked corrections to or differences in a source file, which have hitherto been found in an integration test or a system test, can be detected at the stage of analyzing a source file at the time of compiling at the application development terminal 105 or the build server 102, and hence bugs or the like in the source file 509 can be extracted earlier than can be extracted in the related art.

When report information is an error, inhibition of generation of an executable binary file (or interruption of compiling) can avoid wasteful execution of a unit test and the like, thus shortening the development period of a loosely-coupled business process and reducing the work needed for the development.

Further, it is possible to generate an automatically generated source as an individual program for managing inputs and outputs of a business process or a process based on the flow defining file representing the order of execution of processes in a business process or the order of execution of modules within a process. As a result, the executable binary file creating part 405 adds data set such as a table to be operated described in the automatically generated source in addition to the executable binary file 510 in the source file 509 to generate the executable binary file 510. In the unit test of Step 125 of FIG. 2 or the like, execution of the executable binary file 510 at the application development terminal 105 can automatically generate a table or the like needed for processing without requiring preparation of the table beforehand by the developer. This makes it possible to improve the efficiency of developing a loosely-coupled business process. When report information is an error, automatic generation is inhibited so that wasteful generation of an output can be prevented.

The configuration, the processing part, the processing means, and the like of the computer or the like according to this invention described herein may be partially or entirely achieved by dedicated hardware.

Various kinds of software exemplified in the description of this embodiment may be stored in electromagnetic, electronic, optical, and other various recording media (e.g., non-transitory storage medium), and may be downloaded onto a computer over a communication network such as the Internet.

A program for achieving the individual functions of a compiler and information such as tables may be stored in the storage 506, a storage device such as a non-volatile semiconductor memory, hard disk drive, and solid state drive (SSD), or a computer-readable non-transitory storage medium such as an IC card, SD card, and DVD.

This invention is not limited to the above-mentioned embodiment, but includes various modifications. For example, the above-mentioned embodiment has been described in detail to facilitate understanding of this invention, and is not necessarily be limited to the configuration including all the components described above.

What is claimed is:

1. A compiling method for outputting an executable binary file, the method comprising:
   receiving, by a compiler executing on a computer, an interface file that includes declarative information for:
      (i) a business process, wherein the business comprises one or more primary processes, wherein each primary process contains one or more Create (C), Read (R), Update (U) or Delete (D) operations;
      (ii) input/output information of data of the business process, and
      (iii) operation information for a data set used in the business process;
   determining, by a compiler process, if a premise business process is defined for the business process based on a table-adding pattern, wherein the premise business process includes a definition of a new contract having one or more entries expressed via the table-adding pattern, where the table-adding pattern is evaluated as true or false;
   if the premise business process is defined, collecting, by the compiler process, C (Create) and D (Delete) information for the one or more primary processes of the business process;
   identifying, by the compiler process, indications for the one or more primary processes that contain R or U operations that can be validated in a respective local process, wherein the respective local process is visible only to the compiler; wherein the respective local process is performed by the compiler and discrete from the business process;
   resolving, by the compiler process, indications of whether each of the one or more primary processes contain one or more R or U operations that cannot be completed in the respective local process;
   subsequent to a successful resolving of said indications, collecting, by the compiler process, Create, Read, Update, Delete (CRUD) information for each of the one or more primary processes based on the indications;
   creating, by the compiler process, a validation result based upon the CRUD information;
   inhibiting, by the compiler process, generation of the executable binary file when the validation result is invalid; and
   generating, by the compiler process, the executable binary file from a source file containing the interface file when the validation result is valid.

2. The compiling method according to claim 1, further comprising:
   validating the input/output information of data of the business process; and
   inhibiting generation of the executable binary file when a result of the validating is invalid.

3. The compiling method according to claim 2, further comprising:
   generating, by the compiler process, report information at one of a time when the validation result is invalid, and the time when the result of a second validation result for the data set defined in the interface file is invalid.

4. The compiling method according to claim 2, further comprising:
   validating the input/output information for each of the one or more primary processes.

5. The compiling method according to claim 1, further comprising:
   validating, by the compiler process, based on the input/output information of data defined in the interface file, that input information of each of the one or more primary processes is defined as one of input information of the business process, and output information in a particular primary process preceding the local process in the business process.

6. The compiling method according to claim 1, further comprising:
   generating, by the compiler process when the validating result is valid, the data set to be used in the premise business process.

7. A non-transitory computer-readable storage medium, containing instructions to perform a method of a compiler generating an output of an executable binary file, the instructions when executed by one or more processors, cause the one or more processors to:
   receive an interface file that includes declarative information for:
      (i) a business process, wherein the business comprises, one or more primary processes, wherein each primary process contains one or more Create (C), Read (R), Update (U) or Delete (D) operations,
      (ii) input/output information of data of the business process, and
      (iii) operation information for a data set used in the business process;
   determine if a premise business process is defined for the business process based on a table-adding pattern, wherein the premise business process includes a definition of a new contract having one or more entries expressed via the table-adding pattern, where the table-adding pattern is evaluated as true or false;
   if the premise business process is defined, collect, C (Create) and D (Delete) information for the one or more primary processes of the business process;
   identify indications for the one or more primary processes that contain R or U operations that can be validated in a respective local process, wherein the respective local process is performed by the compiler and discrete from the business process;
   resolve indications of whether each of the one or more primary processes contain one or more R or U operations that cannot be completed in the respective local process;
   subsequent to a successful resolving of said indications, collect Create, Read, Update, Delete (CRUD) information for each of the one or more primary processes based on the indications;
   creating a validation result based upon the CRUD information;
   inhibit generation of the executable binary file when the validation result is invalid; and
   generate the executable binary file from a source file containing the interface file when the validation result is valid.

8. The non-transitory storage medium according to claim 7, wherein the instructions further cause the one or more processors to:
   validate the input/output of the business process to generate the validation result; and inhibit generation of the executable binary file when the validation result is invalid.

9. The non-transitory storage medium according to claim 8, wherein the instructions further cause the one or more processors to:
generate report information at one of a time when the validation result is invalid, and the time when a second validation result of the operation information for the data set defined in the interface file is invalid.

10. The non-transitory storage medium according to claim 8, wherein the instructions further cause the one or more processors to:
validate the input/output information for each of the one or more primary processes.

11. The non-transitory storage medium according to claim 10, wherein the instructions further cause the one or more processors to:
validate, based on the input/output information defined in the interface file, that input information of each of the one or more primary processes is defined as one of input information of the business process, and output information in a particular primary process preceding the local process in the business process.

12. The non-transitory storage medium according to claim 7, wherein the instructions further cause the one or more processors to:
generate, when the validation result is valid, the data set to be used in the business process.

13. A compiling apparatus, comprising a compiler for controlling a computer comprising a processor and a memory to read a source file thereinto and output an executable binary file, the compiler comprising:
an analysis part configured to:
receive an interface file that includes declarative information for:
  (i) a business process, wherein the business comprises one or more primary processes, wherein each process contains one or more Create (C), Read (R), Update (U) or Delete (D) operations,
  (ii) input/output information of data of the business process, and
  (iii) operation information for a data set used in the business process;
determine if a premise business process is defined for the business process based on a table-adding pattern, wherein the premise business process includes a definition of a new contract having one or more entries expressed via the table-adding pattern, where the table-adding pattern is evaluated as true or false;
if the premise business process is defined, collect, C (Create) and D (Delete) information for the one or more primary processes of the business process;
identify indications for the one or more primary processes that contain R or U operations that can be validated in a respective local process, wherein the respective local process performed by the compiler and discrete from the business process;
resolve indications of whether each of the one or more primary processes contain one or more R or U operations that cannot be completed in the respective local process;
subsequent to a successful resolving of said indications, collect Create, Read, Update, Delete (CRUD) information for each of the one or more primary processes based on the indications; and
a binary translation part configured to:
create a validation result based upon the CRUD information; and
inhibit generation of the executable binary file when the validation result is invalid; and
an executable binary file creating part for controlling the computer to generate the executable binary file from the source file containing the interface file when the validation result is valid.

14. The compiling apparatus according to claim 13, further comprising an error reporting part configured to generate report information when a result of validating the operation information for the data set is invalid.

15. The compiling apparatus according to claim 13, further comprising an automatic generation part configured to generate the data set to be used in the business process when a result of validating the operation information for the data set is valid.

* * * * *